United States Patent [19]
Jones

[11] Patent Number: 4,734,687
[45] Date of Patent: Mar. 29, 1988

[54] MONITORING

[75] Inventor: Edwin P. Jones, Great Malvern, England

[73] Assignee: Smiths Industries Public Limited Company, London, England

[21] Appl. No.: 814,953

[22] Filed: Dec. 31, 1985

[30] Foreign Application Priority Data

Jan. 25, 1985 [GB] United Kingdom ............... 8501936
Feb. 16, 1985 [GB] United Kingdom ............... 8504020

[51] Int. Cl.$^4$ ............................................. G09G 3/00
[52] U.S. Cl. .................................. 340/715; 371/24; 371/9; 371/68
[58] Field of Search ................... 340/715; 371/15, 24, 371/25, 9, 68

[56] References Cited
U.S. PATENT DOCUMENTS 3,866,171 2/1975 Loshbough ..................... 340/715
4,307,392 12/1981 Loshbough et al. ............ 340/715

Primary Examiner—Marshall M. Curtis
Attorney, Agent, or Firm—Pollock, Vande Sande & Priddy

[57] ABSTRACT

A processing system for use in an aircraft display system, or other applications, comprises two parallel lanes. Nominally-identical input signals from sensors are supplied to the input of a first processor in each lane which produces display driving signals that are supplied to respective displays. The display driving signals are also supplied to a second processor in the same lane and to a third processor in the other lane. The second and third processors perform inverse functions on the display driving signals to produce, at their outputs, signals nominally-identical to the input signals to the system. Each lane includes comparators which provide outputs in respect of the difference between the two inverted signals and the input signal. A monitor responds to the comparator outputs to indicate malfunction.

11 Claims, 2 Drawing Figures

MONITORING

BACKGROUND OF THE INVENTION

This invention relates to systems for processing including two signal processing lanes, and to methods of processing signals in two lanes.

The invention is more particularly concerned with systems including provision for monitoring the operation of the two lanes.

In display systems for aircraft, or other applications, it is common practice to have two signal processing lanes which receive nominally-identical inputs and produce nominally-identical outputs. The outputs may be supplied to respective displays or one of the outputs may be selected for supply to a single display. The inputs may be derived from a single source or from respective independent sources, such as two sensors arranged to sense the same variable. In this way, by comparison techniques it is possible to detect a malfunction and, furthermore, a degree of redundancy is possible if means are provided for switching between lanes.

Conventional systems of this kind can be unduly complicated or may not be capable of indicating the origin of all the different possible malfunctions.

BRIEF SUMMARY OF THE INVENTION

It is an object of the present invention to provide improved processing systems and methods.

According to one aspect of the present there is provided a processing system comprising two lanes, each lane including first processor means that is arranged to receive respective first and second nominally-identical input signals, each first processor means being arranged to perform a nominally-identical first function on the respective input signal to produce respective sets of first and second nominally-identical output signals for supply to utilisation means, at least the first lane including: second processor means that is arranged to receive the first set of output signals, said second processor means being arranged to perform a function that is an inverse of the first function so as to produce an inverse signal that is nominally-identical to the first input signal; third processor means that is arranged to receive the set of output signals from the second of the lanes and perform a function that is an inverse of the first function so as to produce an inverse signal that is nominally-identical to the respective input signal; first comparator means that is arranged to receive the input signal of the first lane and the inverse signal from the second processor means so as to produce an output representation in respect of the comparison; and second comparator means that is arranged to receive the input signal of the first lane and the inverse signal from the third processor means so as to produce an output representation in respect of the comparison.

Preferably both the first and second lanes include a respective second processor means that is arranged to receive the respective first and second sets of output signals, each second processor means being arranged to perform a nominally-identical function that is an inverse of the first function so as to produce a respective inverse signal that is nominally-identical to the first or second input signal respectively; a third processor means that is arranged to receive the set of output signals from the other of the lanes and perform a nominally-identical function that is an inverse of the first function so as to produce a respective inverse signal that is nominally-identical to the respective input signal; a first comparator means that is arranged to receive the input signal of the respective lane and the inverse signal from the second processor means so as to produce an output representation in respect of the comparison; and a second comparator means that is arranged to receive the input signal of the respective lane and the inverse signal from the respective third processor means so as to produce an output representation in respect of the comparison.

The inverse function may include a set of inverse functions.

Each lane may have a respective utilisation means associated therewith and preferably the utilisation means includes display means, the said first function converting the input signal into display driving signals.

The input signals to each lane may be derived from independent sources and the system may include switching means operable to switch said sources to connection with a different one of the lanes.

The system may include further comparator means arranged to compare the first and second input signals with each other and to provide an output representation in respect of the comparison. Preferably the system includes two further comparator means associated respectively with a different one of said lanes, both said further comparator means providing respective output representations in respect of a comparison between the first and second input signals.

The functions may be performed by programming of the first, second and third processor means, the programming of the functions being derived independently of each other, and the first, second and third processor means in the first or both lanes may be provided by programming of a single processing unit in the or each lane.

The system may include monitor means arranged to receive the output representations from said comparator means.

According to another aspect of the present invention there is provided a display system including a processing system according to the one aspect of the present invention and display means connected to receive the output signals from the two lanes.

According to a further aspect of the present invention there is provided a display system for an aircraft including a processing system according to the one aspect of the present invention, and first and second display means mounted on opposite sides of the aircraft cockpit, the first and second display means being connected to receive respective output signals from the two lanes.

According to yet another aspect of the present invention there is provided a method of monitoring first and second nominally-identical input signals comprising the steps of: performing independent nominally-identical first functions on each respective input signal to produce respective first and second nominally-identical output signals; supplying said first and second output signals to utilisation means; performing on both said output signals respective nominally-identical functions which are inverses of the first functions, so as to produce respective inverse signals which are nominally-identical to said first and second input signals; comparing the inverse signals derived from the first input signal with the first input signal so as to produce a first output representation in respect of the comparison; and comparing the inverse signals derived from the second input signal with the first input signal so as to produce a second output representation in respect of the comparison.

The method may include the steps of performing on both said output signals respective nominally-identical independent functions which are inverses of the first functions; comparing a second of the inverse signals derived from the first input signal with the second input signal so as to produce a third output representation in respect of the comparison; and comparing a second of the inverse signals derived from the second input signal with the second input signal so as to produce a fourth output representation in respect of the comparison. Preferably the method include the steps of comparing the first and second input signals and deriving a fifth output representation in respect of the comparison.

A display system for an aircraft, including a processing system, and its method of operation, in accordance with the present invention, will now be described, by way of example, with reference to the accompanying drawings.

DETAILED DESCRIPTION

Figure 1:
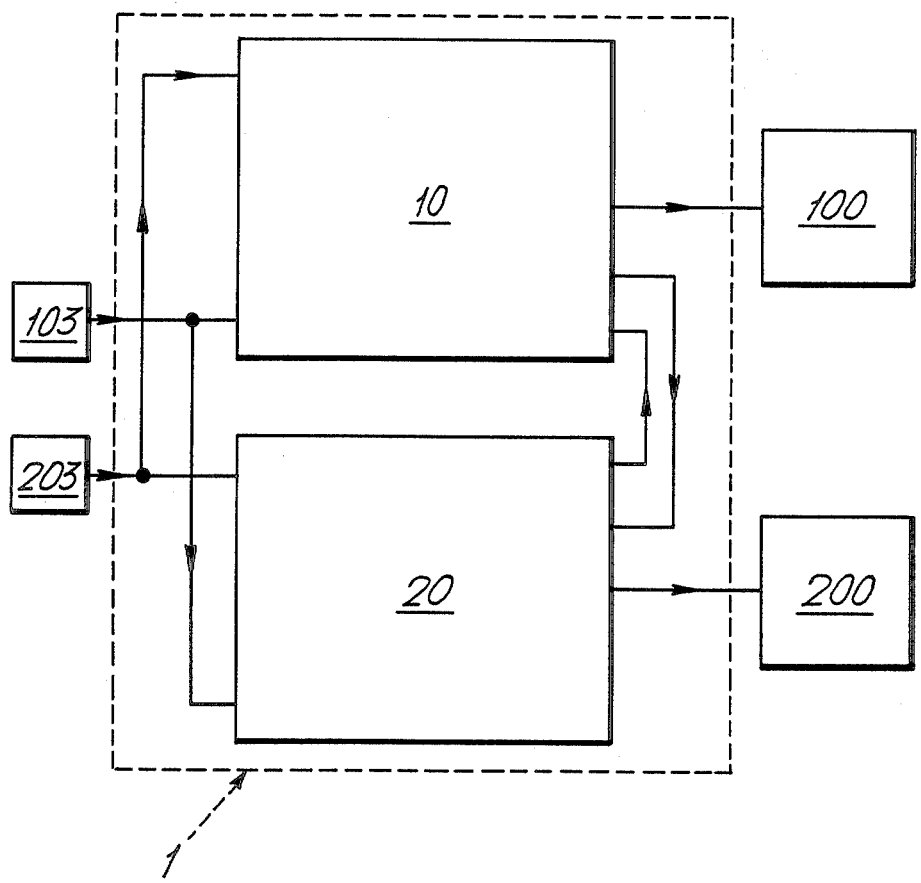
FIG. 1 shows the display system schematically.
Figure 2:
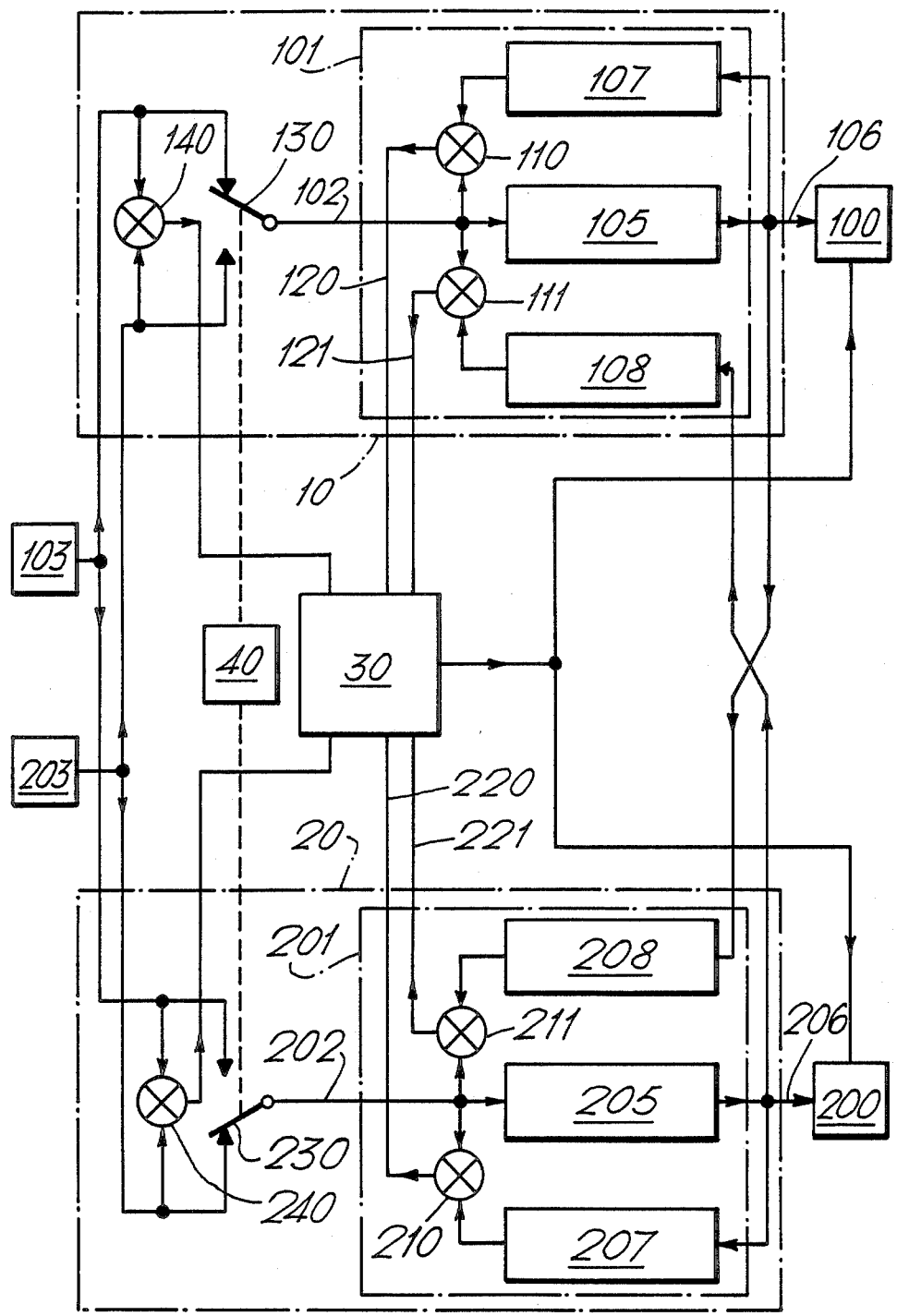
FIG. 2 shows the system in greater detail.

The display system includes a processing system 1 and two display units 100 and 200 that are mounted on opposite sides of the aircraft cockpit, for providing flight information to both pilots. The display units 100 and 200 receive signals from respective lanes 10 and 20 in the system that operate independently of one another but the operation of which is continuously or intermittently compared and monitored. The display system also includes two independent signal soruces 103 and 203 that supply nominally-identical signals to the processing lanes 10 and 20 respectively. The sources 103 and 203 may be sensors responsive to, for example, pitch attitude, roll attitude, heading, localiser and glide slope deviation or altitude. Each lane 10 and 20 includes a signal generating unit 101 and 201 respectively that processes the sensor outputs to produce a set of suitable graphics display driving signals for display on the respective display unit 100 or 200.

A monitoring operation is performed by each lane by, firstly, comparing the output signals, after suitable transformations, with the corresponding input signal, so as to monitor the functional integrity of the respective signal generating unit, and secondly by comparing the output signals, after suitable transformations, from one lane with the corresponding signal in the other lane, so as to monitor the nominal equality of the two lanes.

Each signal generating unit 101 and 201 includes a processor 105, 205 which receives as an input, a signal from the appropriate source 103, 203 via line 102, 202. The processor 105, 205 performs a function on the respective input to convert it into a set of graphics display driving signals. These output signals are supplied via line 106, 206 to the respective display unit 100, 200. The output signals are also supplied to an inverting processor 107, 207 in the respective signal generating unit 101, 201, and to another inverting processor 208, 108 in the signal generating unit of the other lane. Each inverting processor 107, 207, 108 and 208 performs a function on the signals supplied to it that is an inverse of the respective function performed by the processors 105 and 205. In this way, the set of output inverse signals from each inverting processor 107, 207, 108 and 208 are each nominally-identical to the input signal supplied to the processors 105, 205, and nominally-identical to each other. Any difference between these signals greater than a permitted threshold that allows for computional errors and time delays, indicates a malfunction somewhere in the processing system or the sensors.

The input signals are compared with the inverted signals by means of comparatos. Each signal generating unit 101, 202 includes two comparators 110, 111 and 210, 211. One comparator 110, 210 in each unit receives, at one input, the input signal on line 102 and 202 respectively and, at its other input, the set of inverted output signals from the processor 107 and 207 respectively which are derived from the input signal in the respective lane. The other comparator 111, 211 in each unit also receives, at one input the input signal on line 102 and 202 respectively, but receives, at its other input, the set of inverted output signals from the processor 108 and 208 respectively which are derived from the input signal in the other lane. Each comparator 110, 111, 210 and 211 supplies an output representation indicative of the comparison it performs, via line 120, 121, 220 and 221 respectively to a monitor unit 30.

The monitor unit 30 may include a display itself or supply signals to the display units 100 and 200 so that an indication of correct functioning or malfunctioning is provided. The monitor unit 30 may also control switching of elements within the system so that identified malfunctioning elements are disconnected and both display units 100 and 200 are supplied with correct signals.

The input signals referred to above are from independent nominally-identical sources 103 and 203 although they could be from the same source. In the arrangement shown int he drawings, each lane 10, 20 includes a switch 130 and 230 which is operable to connect the input lines 102 and 202 to one or other of the sources 103 and 203. The two switches 130 and 230 are preferably ganged together so that, at any time, the input signals to the two signal generating units are derived from different ones of the sources 103 and 203. Switching of the two switches 130 and 230 is controlled by a switching control unit 40.

Each lane 10, 20 may also include a further comparator 140, 240 which compares the signals from the two sources 103 and 203 with each other and supplies respective output representations to the monitor unit 30.

In practice, the processors 105, 107 and 108 and the processors 205, 207 and 208 are not provided by one or more processing units or computers ine ach lane which is programmed to perform, in combination, the function by which the graphics display command signals and the two sets of inverse functions are derived. These processing units or computers are constituted by the signal generating units 101 and 201 which can also each perform the two comparisons described above as being performed by the comparators 110 and 111, and 210 and 211. It will be appreciated therefore that, in practice, a malfunction of the signal generating unit 101 or 201 will affect the functions performed by all three of the processing units described.

If we consider the outputs of only the comparators 110 and 111 in one lane 10, it is apparent that they can indicate four different states, as follows:

(1) both comparators indicating similar inputs;
(2) comparator 110 indicating similar inputs, comparator 111 indicating differing inputs;

(3) comparator 110 indicating differing inputs, comparator 111 indicating similar inputs;
(4) both comparators indicating differing inputs.

In state (1) the signal generating unit is operating correctly and no action need be taken.

In state (2) the output supplied to the display 100 is consistent with the input signals on line 102, but the output of the inverse processor 108 is inconsistent with the input signals on line 102. Since the output of the comparator 110 indicates that units 105 and 107 are performing correctly, the unit 108 may be functioning correctly because the function carried out by this unit is in fact carried out in the same unit that carries out the other two functions. This thereby indicates that there is disagreement between the inputs supplied to the two lanes 10 and 20.

In state (3) the output signal supplied to the display 100 is inconsistent with the input signal on line 102 supplied to the unit 101, but is consistent with the signal supplied to the display 200 in the other lane 20. This indicates a failure in unit 101.

In state (4) the output signal supplied to the display 100 is inconsistent with the input signal supplied to the unit 101, and is inconsistent with the signal supplied to the display 200 by the other unit 201. This indicates that there is a common mode failure of the units 101 and 201 thereby causing the monitor unit 30 to produce a display "SGU FAIL".

The invention thereby provides monitoring of the actual displayed values, rather than merely input values. By utilizing the indications from each comparator 110, 111, 210, 211, 140 and 240, the monitor unit 30 can detect a wide range of faults and produce an appropriate display message. In many cases, the fault can be diagnosed in such a way as to allow reconfiguration of the system from operative units, or enable the user to identify and use correctly functioning parts of the system.

In order to eliminate the possibility of programming common-mode errors, the programming of the function and the inverse function are developed independently of one another.

The invention is not limited to use in display system but could be employed where output signals are derived from two lanes, such as, for example, for use in performing a control function or in the generation of processed data signals such as in an air data computer.

What I claim is:

1. Signal processing apparatus for fault monitoring comprising:
    two parallel lanes each including a first and a second signal processor means;
    means for applying a nominally identical input signal to the respective said first processor means of each of said two parallel lanes;
    each of said first processor means performing nominally identical processing functions on the respective input signal applied thereto for producing thereby two corresponding nominally identical output signals, one for each said lane;
    each said second processor means performing nominally identical inverse signal processing functions on the respective said output signal of the associated first processor means for producing therby two nominally identical inverse signals, one for each lane, each said inverse signal being nominally identical to the corresponding one of said two input signals;
    first comparator means responsive jointly to said input signal of the first lane and said inverse signal from said second processor means of said first lane for providing a first output manifestation of the comparison;
    third processor means also responsive to the output signal of the first processor of one of said two lanes for performing a nominally inverse signal processing function for producing a nominally inverse signal which is nominally identical to the input signal associated with said one lane;
    second comparator means responsive jointly to said inverse signal from said third processor means and to the input signal of the other of said lanes for producing a further output manifestation of the comparison.

2. A processing system according to claim 1, wherein both the said first and second lanes include: a respective second processor means; means connecting each said second processor means to receive the respective said first and second sets of output signals, each second processor means being configured to perform a nominally-identical function that is an inverse of the first function so as thereby to produce a respective inverse signal that is nominally-identical to the respective input signal; third processor means; means connecting each said third processor means to receive the set of output signals from the other of the said lanes, said third processor means being configured to perform a nominally-identical function that is an inverse of the first function so as to produce a respective inverse signal that is nominally-identical to the respective input signal; a first comparator means; means connecting each said first comparator means to receive the input signal of the respective lane and the inverse signal from the said second processor means so as thereby to produce an output representation in respect of the comparison; second comparator means; and means connecting each said second comparation means to receive the input signal of the respective lane and the inverse signal from the respective third processor means so as thereby to produce an output representation in respect of the comparison.

3. A processing system according to claim 1, including first and second display means, means connecting each said display means to receive the output signals from a respective first processor means, and wherein the said first function converts the input signals into display driving signals.

4. A processing system according to claim 1 including two independent sources and means supplying nominally-identical signals from both sources as input signals to respective ones of said lanes.

5. A processing system according to claim 4, wherein the system includes switching means, said switching means being operable to switch said sources to connection with a different one of said lanes.

6. A processing system according to claim 1, wherein the system includes further comparator means, and means connecting said further comparator means to receive both said input signals, said further comparator means comparing said input signals with one another and providing an output representation in accordance therewith.

7. A processing system according to claim 1, wherein the said functions are performed by programming of the first, second and third processor means, and wherein the programming of the functions is derived independently of each other.

8. A processing system according to claim 1, wherein the first, second and third processor is provided by programming of a single processing unit.

9. A processing system comprising two parallel lanes, wherein each lane comprises: an input; a first processor means; means connecting each first processor means with its respective input, each first processor means being configured to perform a nominally-identical first function on signals at the respective input so as thereby to produce respective sets of nominally-identical output signals; a second processor means; means connecting each second processor means to receive respective sets of output signals, each said second processor means being configured to perform a nominally-identical function that is an inverse of the said first function so as to produce an inverse signal that is nominally-identical to the first input signal; a third processor means; means connecting each third processor means to recive the set of output signals from the other of the lanes, each said third processor means being configured to perform a nominally-identical function that is an inverse of the first function so as to produce aninverse signal that is nominally-identical to the respective input signal; comparator means; and means connecting said comparator means to receive the signal at the input to the respective lane and the set of output signals from the respective second and third processor means, the comparator means producing output representations in respect of the difference between the signal at the input of the respective lane and sets of output signals from the respective second and third processor means.

10. A display system comprising: display means; a processing system of the kind comprising two parallel lanes, each lane including first processor means that receives respective nominally-identical input signals, each first processor means being configured to perform a nominally-identical first function on the respective input signal thereby to produce respective sets of nominally-identical display driving signals; and means connecting said display means to said processing system to receive said display driving signals, the improvement wherein at least the first lane includes: second processor means, means connecting the said second processor means to receive the said first set of display driving signals, said second processor means being configured to perform a function that is an inverse of the first function so as to produce an inverse signal that is nominally-identical to the first input signal; third processor means; means connecting the said third processor means to receive the set of display driving signals from the second of the lanes said third processor means being configured to perform a function that is an inverse of the first function so as therby to produce an inverse signal that is nominally-identical to the respective input signal; first comparator means; means connecting the said first comparator means to receive the input signal of the first lane and the inverse signal from the said second processor means so as thereby to produce an output representation in respect of the comparison; second comparator means; and means connecting the said second comparator means to receive the input signal of the first lane and the inverse signal fromt he said third processor means so as thereby to produce an output representation in respect of the comparison.

11. A method of monitoring two nominally-identical input signals comprising the steps of: performing independent nominally-identical first functions on the respective input signals so as thereby to produce respective nominally-identical output signals; supplying the output signals to utilization means; performing on the said output signals respective nominally-identical functions which are inverses of the first functions, so as thereby to produce respective inverse signals which are nominally-identical to said input signals; comparing the inverse signals derived from one of said input signals with the said input signal so as to produce one output representation in respect of the comparison; and comparing the inverse signals derived from the other input signals with the one input signal so as to produce another output representation in respect of the comparison.

* * * * *